(12) United States Patent
Okvist et al.

(10) Patent No.: US 9,198,190 B2
(45) Date of Patent: Nov. 24, 2015

(54) CLOSED LOOP PRECODING WEIGHT ESTIMATION

(75) Inventors: Peter Okvist, Lulea (SE); Henrik Asplund, Stockholm (SE); Jonas Froberg Olsson, Ljungsbro (SE); Arne Simonsson, Gammelstad (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 467 days.

(21) Appl. No.: 13/575,337

(22) PCT Filed: Dec. 29, 2010

(86) PCT No.: PCT/SE2010/051492
§ 371 (c)(1),
(2), (4) Date: Jul. 26, 2012

(87) PCT Pub. No.: WO2011/093761
PCT Pub. Date: Aug. 4, 2011

(65) Prior Publication Data
US 2012/0314798 A1    Dec. 13, 2012

(30) Foreign Application Priority Data

Jan. 27, 2010   (WO) ................. PCT/SE2010/050071

(51) Int. Cl.
| | | |
|---|---|---|
| H04K 1/10 | (2006.01) |
| H04L 27/28 | (2006.01) |
| H04W 72/12 | (2009.01) |
| H04L 1/20 | (2006.01) |
| H04L 25/02 | (2006.01) |
| H04L 1/00 | (2006.01) |
| H04W 28/04 | (2009.01) |

(52) U.S. Cl.
CPC ......... *H04W 72/1231* (2013.01); *H04L 1/0023* (2013.01); *H04L 1/0026* (2013.01); *H04L 1/20* (2013.01); *H04L 25/0226* (2013.01); *H04W 28/04* (2013.01)

(58) Field of Classification Search
CPC ...... H04L 1/20; H04L 25/0226; H04W 28/00
USPC .......................... 375/260, 267, 295, 299, 316
See application file for complete search history.

(56) References Cited

U.S. PATENT DOCUMENTS

| 2010/0091893 A1* | 4/2010 | Gorokhov ...................... 375/260 |
| 2011/0002280 A1* | 1/2011 | Davydov et al. .............. 370/329 |
| 2011/0150052 A1* | 6/2011 | Erell et al. .................... 375/219 |

FOREIGN PATENT DOCUMENTS

| WO | 2008115585 A2 | 9/2008 |
| WO | 2009023863 A1 | 2/2009 |
| WO | 2009084903 A2 | 7/2009 |

*Primary Examiner* — Freshteh N Aghdam
(74) *Attorney, Agent, or Firm* — Rothwell, Figg, Ernst & Manbeck, p.c.

(57) ABSTRACT

Embodiments herein relate to a method in a first communication node (201) for estimating pre-coding weights for transmission on a radio channel (205) between the first node (201) and a second communication node (203) in a communication network (200). The first node (201) comprises at least two transmit antennas. Each transmit antenna is configured to transmit on each of at least two sub-bands. The first node (201) obtains at least two pre-coding reports. Each pre-coding report is for a different time instance. Each pre-coding report comprises pre-coding weights or indications to pre-coding weights. The pre-coding weights are associated with each transmit antenna and with each sub-band. For each transmit antenna, the first node (201) estimates pre-coding weights for at least one of the sub-bands based on the pre-coding weights in the obtained pre-coding reports. The estimated pre-coding weights are different from a most resent of the obtained pre-coding reports.

11 Claims, 9 Drawing Sheets

CLOSED LOOP PRECODING WEIGHT ESTIMATION

TECHNICAL FIELD

Embodiments herein relate generally to a first communication node and a method in the first communication node. More particularly the embodiments herein relate to estimating pre-coding weights for a multi-antenna transmission on a radio channel between the first communication node and a second communication node in a communication network.

BACKGROUND

In a typical cellular system, also referred to as a wireless communications network, wireless terminals communicate via a Radio Access Network (RAN) to one or more core networks. The wireless terminals may be mobile stations or user equipment units such as mobile telephones also known as "cellular" telephones, and laptops with wireless capability.

The radio access network covers a geographical area which is divided into cell areas, with each cell area being served by a base station, e.g., a Radio Base Station (RBS), which in some networks is also called Evolved Node B (eNB), NodeB or B node and which in this document also is referred to as a base station. A cell is a geographical area where radio coverage is provided by the radio base station equipment at a base station site. Each cell is identified by an identity within the local radio area, which is broadcast in the cell. A base station communicates over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The Third Generation Partnership Project (3GPP) has undertaken to further evolve the UTRAN and GSM based radio access network technologies. In 3GPP this work regarding the $3^{rd}$ Generation (3G) Long Term Evolution (LTE) system is ongoing.

Pre-coding is a technique which supports multi-layer transmission in multi-antenna wireless communications. In short, a transmitter sends coded information to a receiver in order to the pre-knowledge of the channel. In single-layer beamforming, the same signal is emitted from each of the transmit antennas with appropriate weighting such that the signal power is maximized at the receiver output. When the receiver has multiple antennas, single-layer beamforming cannot simultaneously maximize the signal level at all of the receive antenna. Thus, in order to maximize the throughput in multiple receive antenna systems, multi-layer beamforming is required.

Single-layer transmission refers to transmission of the same signal is emitted from each of a plurality of antennas, and multi-layer transmission refers to transmission of multiple data streams.

In point-to-point systems, pre-coding means that multiple data streams are emitted from the transmit antennas with independent and appropriate weightings such that the link throughput is maximized at the receiver output. In multi-user Multiple Input Multiple Output (MIMO), the data streams are intended for different users and some measure of the total throughput, e.g., the total cell performance is maximized. In point-to-point systems, some of the benefits of pre-coding may be realized without requiring channel state information at the transmitter, while such information is essential to handle the co-user interference in multi-user systems.

When code book based pre-coding is used a selected set of pre-coders are defined in a table, the code book. When code book based pre-coding is used a selected set of pre-coders are defined in a table, the code book. A pre-coding matrix indicator (PMI) refers to a referring index into that code book. Pre-coding may also be selected unlimited non discrete or in a non-discrete manner, i.e. called non-code book based pre-coding. PMI or other type of indicator which enables selection of a pre-coding vector may be applied to wireless transmissions in a communication network as a feedback metric used for MIMO pre-coding. The pre-coding process is used to optimize the quality of the signal at the receiver. The following PMI reporting is described for LTE, as an example, but similar reporting procedure applies for e.g. Worldwide Interoperability for Microwave Access (WiMAX) as well.

In the LTE closed-loop spatial multiplexing mode, i.e. with a code book based pre-coding, a base station selects a pre-coder matrix from a predefined codebook with the help of a user equipment's (UE) suggestion in the shape of one or more pre-coding matrix indicators signaled as part of the channel knowledge or information.

LTE is an OFDM (Orthogonal Frequency Division Multiplexing) access. The bandwidth is divided into a number of 15 kHz sub-carriers, orthogonal frequency. 12 such sub-carriers are further grouped into a sub-band, i.e. resource block, of 180 kHz. These sub-bands are the resource block for scheduling and channel state reporting, such as PMI.

The user equipment may be configured to send PMI reports either periodical, e.g. on Physical Uplink Control Channel (PUCCH), or scheduled, e.g. on Physical Uplink Shared Channel (PUSCH). The PMI for the last reporting period may to a various degree of accuracy indicate forthcoming channel quality. However, e.g. user equipment position, user equipment speed and changes in the local propagation environment will alter the fast fading. This makes it clear that the estimated PMI has better short-term than long term accuracy, and that a long delay between measurement and PMI usage may reduce potential gains. Typical shortest feasible delay between measurement and application of PMI is e.g. 10 to 15 ms. For example, the reporting delay may be 6 ms and the reporting interval may be in the order of 5 to 40 ms.

The larger the pre-coding frequency granularity, the larger the gain is but at the cost of larger the reporting overhead. It is desired to increase the reporting period to save uplink radio resources.

The user equipments bases PMI reports on measurements on downlink reference signals. PMI reports are transmitted on uplink control channels to the eNodeB. PMI reporting is comprised in the Channel State Information (CSI) report. Depending on CSI report configuration, a CSI report may comprise of a PMI rank indicator (RI), and CQI (Channel Quality Indicator). The PMI may be reported wideband or frequency selective.

As a user equipment moves, the radio channel will be affected by the altering fast fading. For a given frequency, i.e. sub-band, the channel will fade in the time domain and the fading speed is primarily dependent on the user equipment speed. If considering a specific point in time, one will have more or less similar occurrence, but in the frequency domain instead.

Due to the delays involved in the CSI reporting procedure, the sub-band PMI to be used for pre-coding will be more or less outdated. Having a too outdated PMI will be similar to having a random selection procedure or to have transmit diversity, that is open-loop spatial multiplexing in LTE. This is described in FIG. 1, showing user equipment speed impact on closed loop pre-coding efficiency. The x-axis of FIG. 1 shows mobile speed in km/h. The y-axis of FIG. 1 shows normalized system tp and normalized cell-edge user tp. The line marked with triangles refers to Single Input, Multiple Output (SIMO), the line marked with squares refers to Alamouti codes, the line marked with circles refers to a closed-loop multiplexing and the line marked with diamonds refers to open-loop multiplexing. Alamouti codes is a MIMO transmit diversity scheme for two transmit antennas that does not require transmit channel knowledge.

It is known in that prediction can mitigate the PMI deterioration due to delays. In the patent document US 2007/0206626 it is describes a method of predicting future PMIs at the receiver based on a history of channel estimates, where the receiver additionally feeds back the predicted PMI values to the transmitter. One drawback of such a method is the added complexity in the receiver, which may create an undesirable increase of cost and power consumption. Another drawback is that the prediction is restricted to PMIs which can be fed back to the transmission using efficient signaling, i.e. PMIs belonging to a pre-determined codebook.

SUMMARY

The objective of embodiments herein is therefore to obviate at least one of the above disadvantages and to improve the throughput and signal quality in a communication network.

According to a first aspect, the objective is achieved by a method in a first communication node for estimating pre-coding weights for a multi-antenna transmission on a radio channel between the first communication node and a second communication node in a communication network. The first communication node comprises at least two transmit antennas. Each respective transmit antenna is configured to transmit on each of at least two sub-bands. The at least two sub-bands are comprised in the radio channel. The first communication node obtains at least two pre-coding reports. Each pre-coding report is for a different time instance. Each pre-coding report comprises pre-coding weights or indications to pre-coding weights. The pre-coding weights are associated with each of the respective transmit antennas and associated with each of the respective sub-band. For each transmit antenna, the first communication node estimates pre-coding weights for at least one of the at least two sub-bands based on the pre-coding weights in the at least two obtained pre-coding reports. The estimated pre-coding weights are different from pre-coding weights in a most recent obtained pre-coding reports.

According to a second aspect, the objective is achieved by a first communication node for estimating pre-coding weights for a transmission on a radio channel between the first communication node and a second communication node in a communication network. The first communication node comprises at least two transmit antennas. Each respective transmit antenna is configured to transmit on each of at least two sub-bands. The at least two sub-bands are comprised in the radio channel. The first communication node further comprising an obtaining unit which is configured to obtain at least two pre-coding reports. Each pre-coding report is for a different time instance. Each pre-coding report comprises pre-coding weights or indications to pre-coding weights. The pre-coding weights are associated with each of the respective transmit antennas and associated with each of the respective sub-band. The first communication node also comprises an estimating unit which is configured to, for each transmit antenna, estimate pre-coding weights for at least one of the at least two sub-bands based on the pre-coding weights in the at least two obtained pre-coding reports. The estimated pre-coding weights are different from pre-coding weights in a most recent obtained pre-coding reports.

Thanks to the possibility to utilize pre-coding weights for other, neighbouring, sub-bands when predicting the pre-coder for a particular sub-band and using frequency selective pre-coding in combination with channel prediction, the throughput/signal quality in a wireless communication network is improved when performing MIMO pre-coding.

Embodiments herein afford many advantages, for which a non-exhaustive list of examples follows:

The embodiments herein provide the advantage of improved performance of frequency selective closed loop pre-coding on user equipments with speed above e.g. 3 km/h, basically, for non-static user equipments. Closed loop spatial multiplexing may be used for user equipments at higher speed. Another advantage is that the PMI reporting interval may be reduced that result in decreased uplink control signaling load.

The embodiments herein enable refined pre-coding selection from a discrete channel state information improving the MIMO performance. From the code-book based PMI reporting a non-code book based pre-coder may be selected. Further, from a sub-band grouped PMI reporting a sub-carrier PMI may be selected.

The embodiments herein enable refined pre-coding selection from a discrete channel state information improving the MIMO performance. From the code-book based PMI reporting a non-code book based pre-coder may be selected. Further, from a sub-band grouped PMI reporting, a sub-carrier PMI may be selected.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings in which.

The drawings are not necessarily to scale, emphasize is instead being placed upon illustrating the principle of the embodiments herein.

DETAILED DESCRIPTION

The embodiments herein are related to use of sub-band PMI behavior to predict how a radio channel fades, i.e. sub-band PMI moves in frequency domain, and to use this knowledge as input to frequency selective pre-coding. In more detail, the embodiments herein relate to utilizing frequency selective PMI for other, neighboring, sub-bands when predicting the pre-coder for a particular sub-band. It is also related to frequency selective pre-coding in combination with channel prediction.

Figure 1:
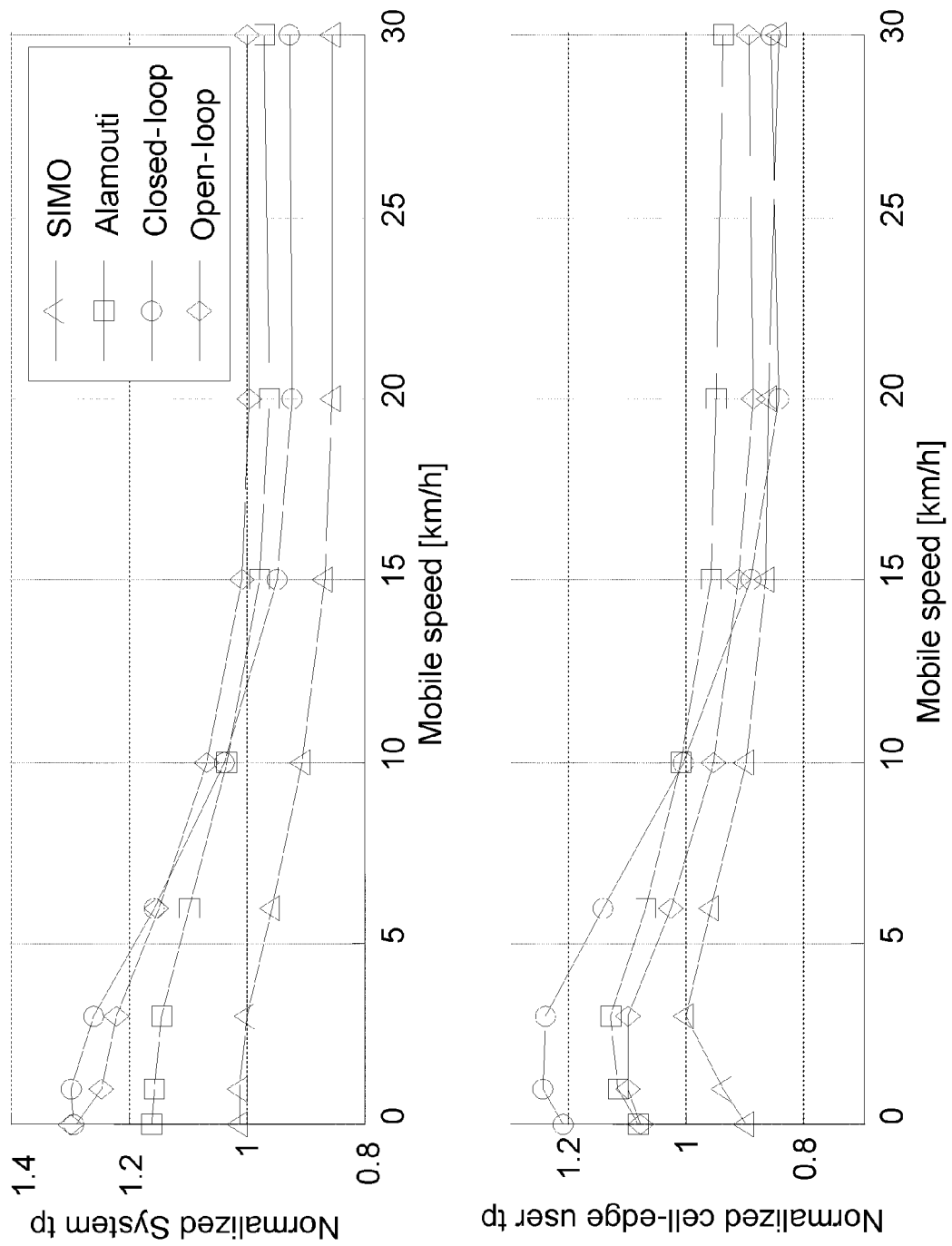
FIG. 1 is a graphical illustration of user equipment speed impact on closed loop pre-coding efficiency.
Figure 2:
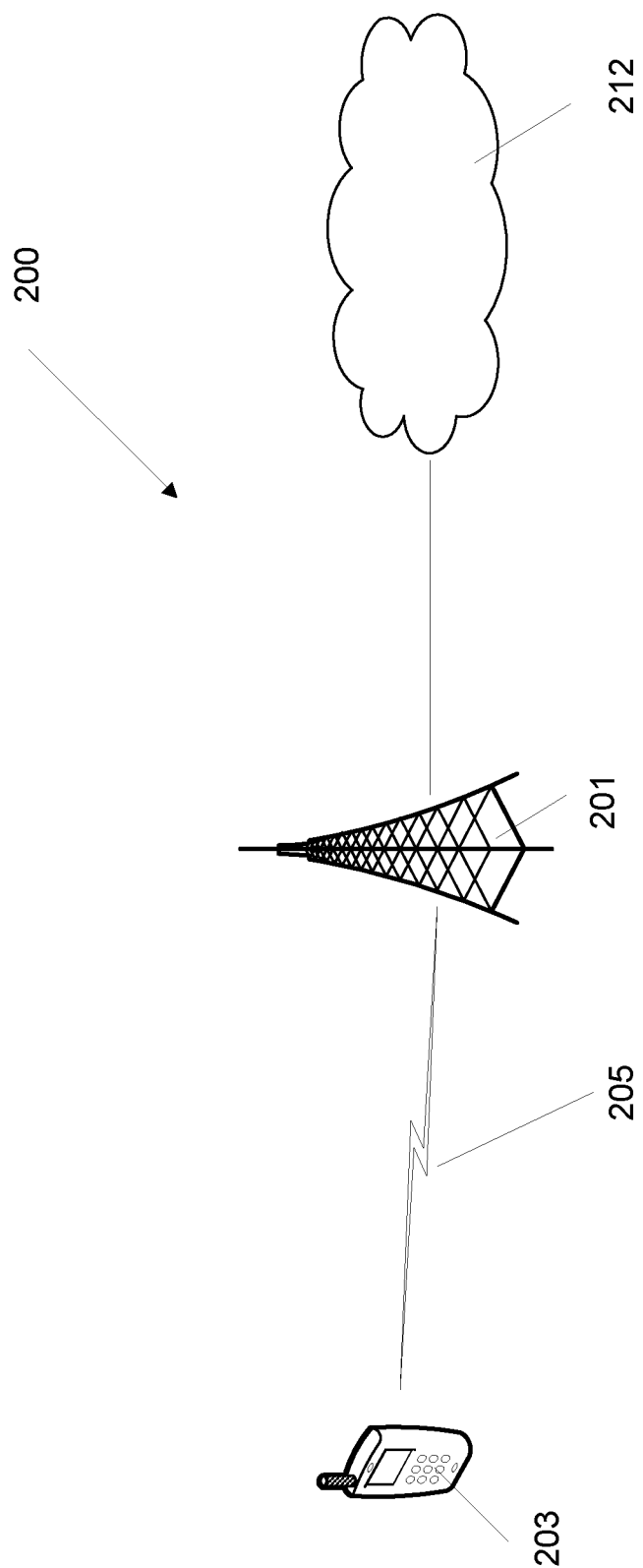
FIG. 2 is a schematic block diagram illustrating embodiments of a wireless communication network.

FIG. 2 is a schematic block diagram illustrating a communication network 200. The network may use technologies such as e.g. LTE, WiMAX, or other radio access where the frequency band is divided into sub-bands, etc. The network 200 comprises at least one first communication node 201 and at least one second communication node 203. The first communication node 201 may be e.g. a base station, eNodeB, etc. The second communication node 203 may be any suitable communication device or computational device with communication capabilities, for instance but not limited to user equipment, mobile phone, personal digital assistant (PDA), laptop, MP3 player, portable DVD player or similar media content devices, digital camera, or even stationary devices such as a PC. The user equipment is referred to as UE in some of the figures. The first communication node 201 and the second communication node 203 communicates with each other using any suitable kind of communication channel 205, e.g. a wireless channel. The communication channel 205 comprises a plurality of radio carriers that may take different multiple paths, i.e. rays, over the air around and reflected on obstacles, and may use any suitable protocol depending on type and level of layer, e.g. as indicated by the Open System Interconnection (OSI) model, as understood by the person skilled in the art.

The first communication node 201 may be connected to a core network 212 providing e.g. internet services to the second communication node 203.

It should be appreciated that the network 200 is configured with cabling, routers, switches, and other network building elements (not shown) as understood by the skilled person, for instance as used for building an Ethernet or Wide Area Network (WAN) network.

The present method for estimating pre-coding weights for transmission on a radio channel 205 between the first communication node 201 and a second communication node 203 in a communication network 200, according to some embodiments will now be described with reference to the combined signaling diagram and flowchart depicted in FIG. 3. The method comprises the following steps, which steps may as well be carried out in another suitable order than described below:

Step 301

The first communication node 201 or the second communication node 203 obtains at least two pre-coding reports. The pre-coding report may be a Pre-coding Matrix Indicator. Each pre-coding report is for a different time instance. For example, a first pre-coding report may be for time instance t1 and a second pre-coding report may be for time instance t2, where t1 takes place before t2. Each pre-coding report comprises pre-coding weights or indications to pre-coding weights. Indications to pre-coding weights may be an index pointing to pre-coding weights in a table, i.e. PMI and code-book based as mentioned above. The pre-coding weights are associated with each of the respective transmit antennas and associated with each of the respective sub-band.

For example, a pre-coding report may comprise, for one data stream between the first communication node 201 and the second communication node 203:

For sub-band 1: the vector [w1 ... wN]_1 with complex, i.e. amplitude and phase, weights for the N antennas.

For sub-band 2: the vector [w1 ... wN]_2 with complex, i.e. amplitude and phase, weights for the N antennas.

etc.

For more than one date stream, a pre-coding report comprises a matrix with one vector per data stream.

In some embodiments, where code book based pre-coding is performed, the pre-coding report may comprise indexes to a table. The table comprises valid pre-coding weights.

A pre-coding report has at least one pre-coding weight per antenna for each data stream that is to be transmitted between the first communication node 201 and the second communication node 203. The number of weights may be calculated by number of antennas times the number of data streams/layer/code words. If one data stream is transmitted, one pre-coding weight is used per antenna and sub-band. If two or more data streams are transmitted, two or more pre-coding weights are used per antenna and sub-bands, one for each data stream. The pre-coding weight vectors are preferably orthogonal between the various data streams.

In code based pre-coding, there is a limited amount of possible pre-coding weights known for both the first communication node 201 and the second communication node 203, e.g. a code book. It may be reported which is the preferred one, e.g. number two, i.e. PMI. In some embodiments, the number of requested data streams, i.e. rank indicator, is reported, in addition to which pre-coding weights that is most suitable, i.e. RI.

The pre-coding weights comprise an antenna channel phase or antenna channel amplitude. The antenna channel phase indicates the phase difference between data streams on channels from each respective antenna, and the antenna channel amplitude indicates the amplitude of the data streams on channels from each respective antenna.

The at least two transmit antennas may be positioned in different sites at different geographical positions in the communication network 200.

Step 302

If the pre-coding reports are obtained from the second communication node 203, the obtained pre-coding reports are transmitted to the first communication node 201.

The pre-coding reports may be transmitted to the first communication node 201 at regular intervals, or when triggered.

If the pre-coding reports are obtained internally in the first communication node 201, step 302 is not performed.

Step 303

For each transmit antenna, the first communication node 201, e.g. the base station, estimates pre-coding weights for at least one of the at least two sub-bands based on the pre-coding weights in the at least two obtained pre-coding reports. The estimated pre-coding weights are different from the most recent of the obtained pre-coding reports. If the obtained reports are for e.g. times t1 and t2, the estimated pre-coding weights are different for the most recent of the obtained reports, i.e. it is different from the report obtained at t2. The estimated pre-coding weights are a function of time and frequency.

Figure 4:
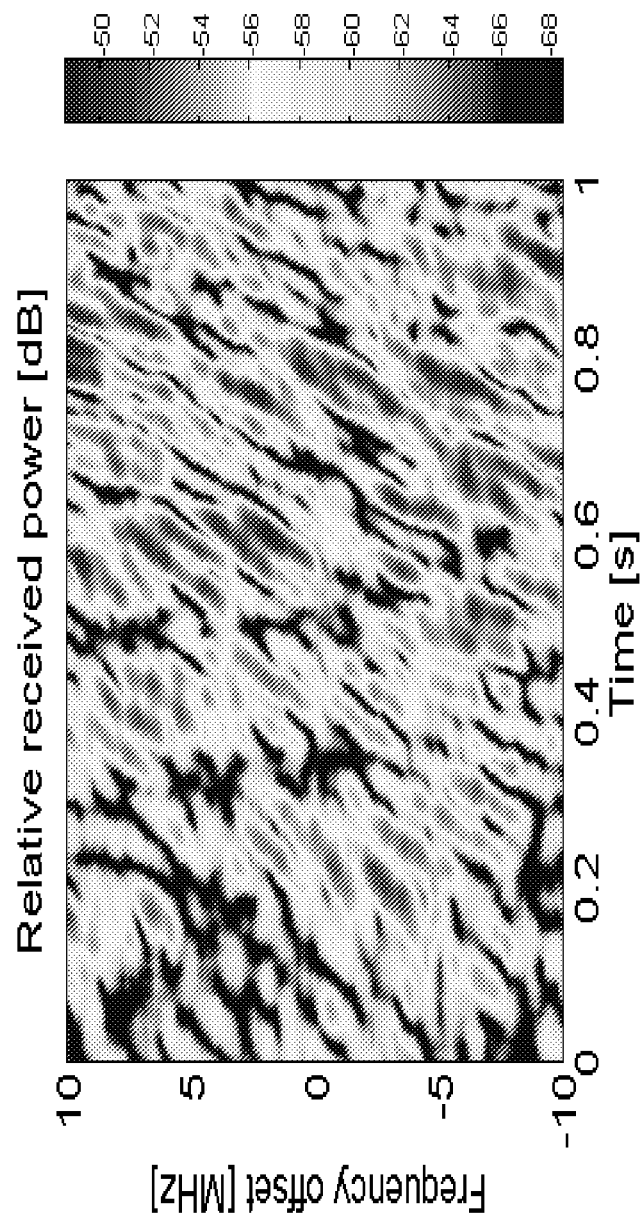
FIG. 4 is a graph illustrating a measured time-frequency channel.

As mentioned above, for a given frequency, i.e. sub-band, the channel will fade in the time domain and the fading speed is primarily dependent on the user equipment speed. If considering a specific point in time, more or less similar occurrence will take place, but in the frequency domain instead. The corresponding diagonal banded structure achieved from direct radio channel measurement is seen in FIG. 4. FIG. 4 illustrates channel gain vs. time and frequency from radio channel measurements. The x-axis of FIG. 4 illustrates the time measured in seconds (s) and the y-axis of FIG. 4 illustrates a frequency offset measured in MHz.

To illustrate the physical background that gives rise to this particular structure in the time-frequency response of the channel 205 as shown in FIG. 4, the following scenario is considered:

A two-ray channel, with one ray having amplitude 1, delay 0, and direction of arrival=0, and a second ray having amplitude 1, delay τ, and direction of arrival=φ. The second communication node 203, e.g. a user equipment, is assumed to move with velocity v in the direction π/2. For this case, the channel 205 may be expressed as:

$$H(t, f) = \exp(2\pi i \cos(0 - \pi/2)vt/\lambda) \cdot \exp(2\pi i f \cdot 0) + \ldots +$$
$$\exp(2\pi i \cos(\varphi - \pi/2)vt/\lambda) \cdot \exp(2\pi i f \tau)$$
$$= 1 + \exp(2\pi i \sin(\varphi)vt/\lambda) \cdot \exp(2\pi i f \tau)$$

Figure 5:
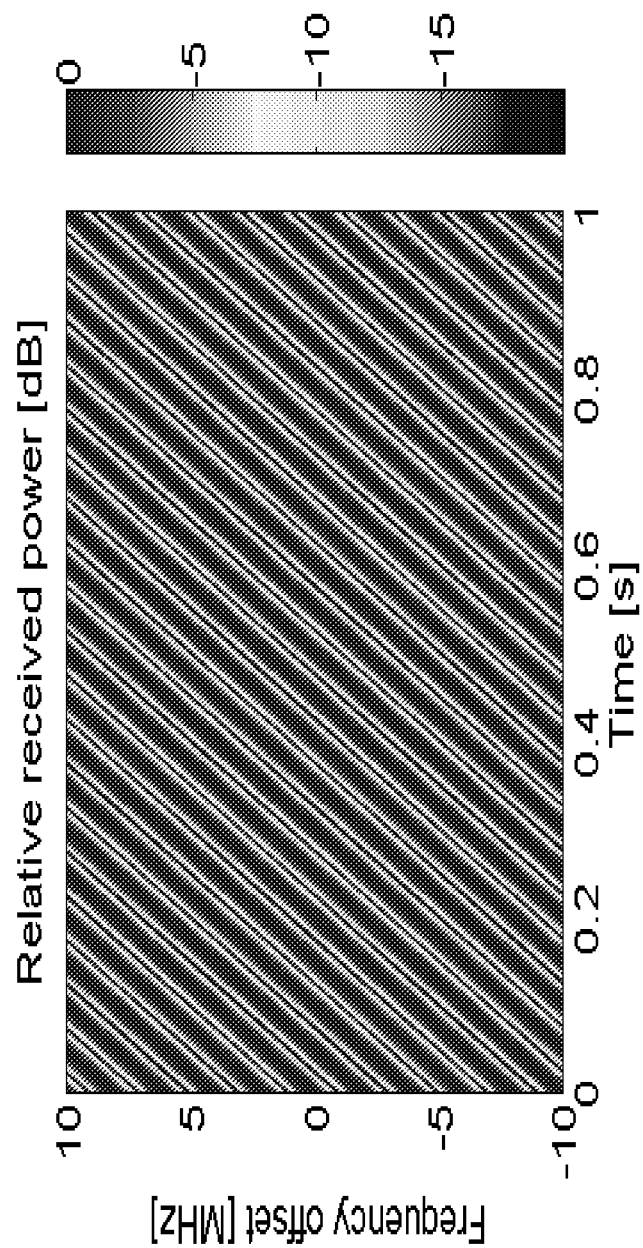
FIG. 5 is a graph illustrating a time frequency channel for a two-ray channel.

With the assumptions that $\sin(\phi)v/\lambda=20$ Hz and $\tau=0.5$ μs the resulting channel will be as depicted in FIG. 5. The x-axis of FIG. 5 illustrates the time measured in seconds (s) and the y-axis of FIG. 5 illustrates a frequency offset measured in MHz. This figure shows a banded structure quite similar to what observed in the measurements illustrated in FIG. 4. FIG. 5 shows a time-frequency channel for a two-ray channel with differing delay and direction of arrival of two channel rays. In this particular example, the Doppler offset between the rays is 20 Hz and the delay offset is 0.5 μs.

In general, there will be many more than two rays making up the channel 205 between the transmitter in the second communication node 203 and a receiver in the first communication node 201. However, not all rays will be equally strong, and therefore it may be expected that some parts of the diagonal structure may be present also in more complex channels, in particular when two rays are dominating in power over the others.

From FIG. 4 and FIG. 5 it may be understood that it is possible to potentially benefit from compensating for the sub-band drift, and that the overall gain will hence be a function of involved CSI reporting delay, user equipment speed and general channel properties.

Figure 6:
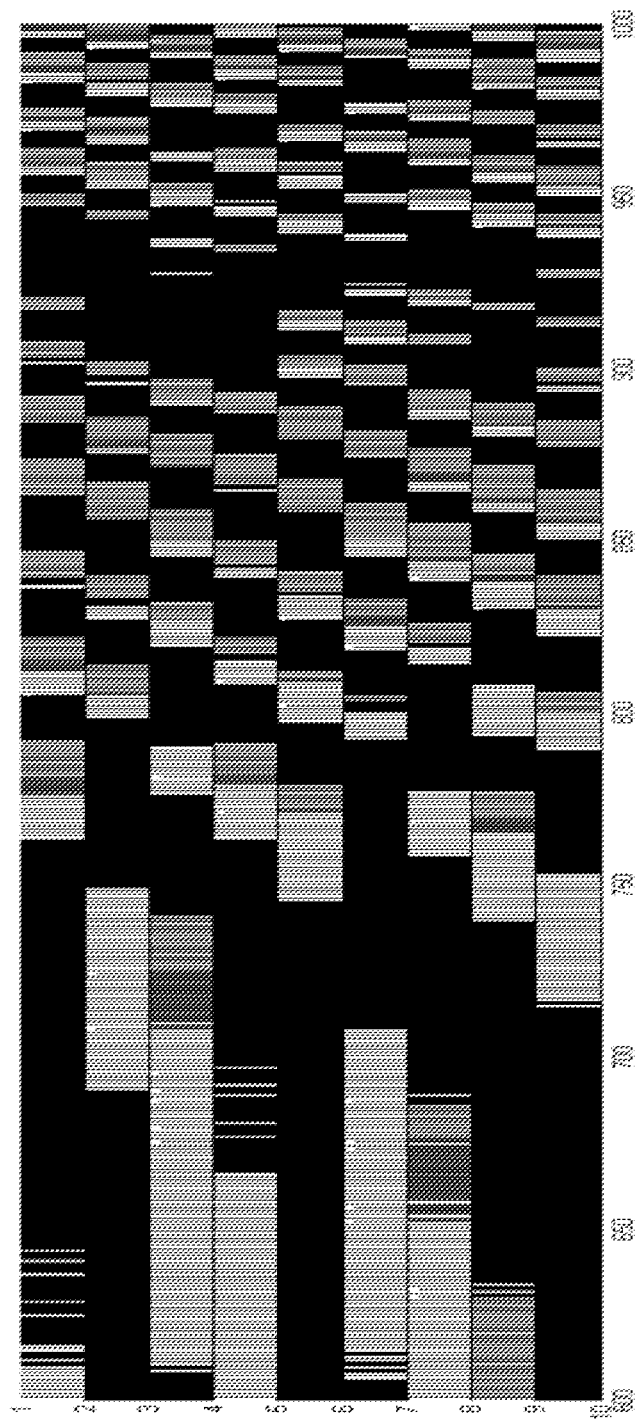
FIG. 6 is a graph illustrating a PMI time versus sub-band pattern.

FIG. 6 illustrates optimal, in mutual information sense, rank-1 PMI for different sub-bands. Mutual information is a theoretical approach to estimate the bitrate. The x-axis shows time ticks, where each tick corresponds to 5.33 ms, while the y-axis shows the sub-band number, where each sub-band is 600 kHz. The different grayscale intensities in the squares represent the different rank-1 PMIs. The FIG. 6 shows a clear and strong sub-band drift in optimal rank-1 PMIs A basic algorithm utilizing the drift shown in FIG. 6 may be to determine the shift s that gives the highest correlation c between reported PMIs of two neighbouring sub-bands, $sb_1$ and $sb_2$. The reported PMIs of the two neighbouring sub-bands correspond to the obtained pre-coding reports described in step 301. If the correlation exceeds some specified threshold, then PMI override is applied.

One example may be the following algorithm:

```
pmi(sb, n):       Value of last reported PMI for sub-band sb at time
                  n.
pmi_used(sb, n):  PMI used in sub-band sb at time n.
win:              Correlation window size
corr_thres:       Correlation threshold
report_delay:     Time between reported PMI is selected and time
                  until it become available.
s:                Variabel.
for sb = 1:8
   best_shift = 0;
   best_corr = -100;
   for s = 1:10
      c = corr(pmi(sb, n-win:n), pmi(sb+1, n-win-s:n-s));
      if c > best_corr
         best_corr = c;
         best_shift = s;
      end
   end
   if best_corr > corr_thres
      // Select shift to be maximum of 1 and difference
      // between best shift and PMI reporting delay
      selected_shift = max([best_shift - report_delay 1]);
      pmi_used(sb,n) = pmi(sb+1, n - selected_shift);
   else
      pmi_used(sb,n) = pmi(sb+1, n);
   end
end
```

Figure 7:
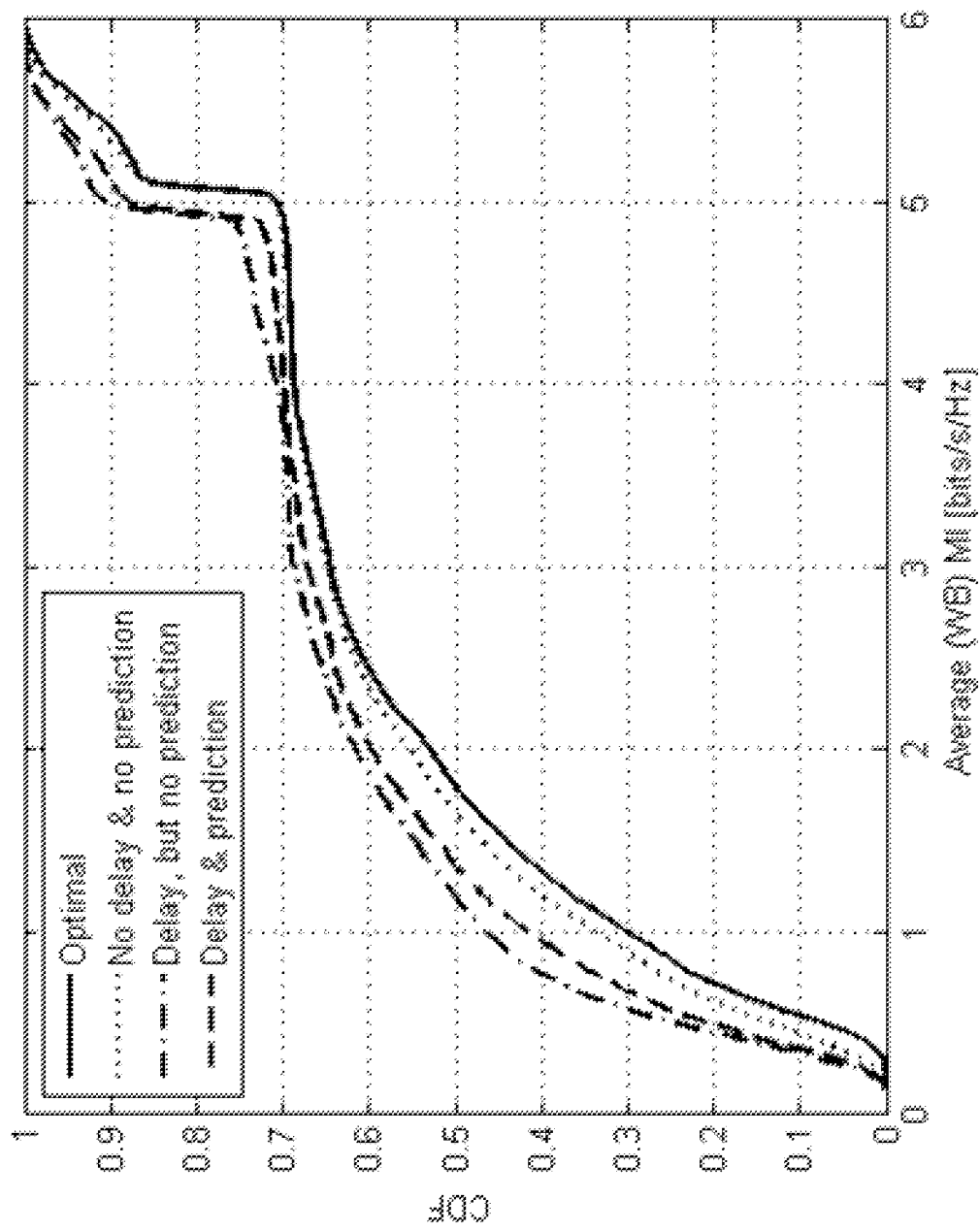
FIG. 7 is a graph illustrating a Cumulative Distribution-Function (CDF) of wide-band average of mutual information using Shannon's formula.

The above algorithm is applied on the data shown in FIG. 7 with the following assumptions:
   PMI is reported every 3 tick, i.e., 3*5.33 ms.
   There is a reporting delay of 1 tick.
   corr_thres=0.
   PMI override is only allowed if the difference between current time and receiving time of last PMI report is at least 1 tick.

The result may be seen FIG. 7, illustrating a Cumulative Distribution-Function (CDF) of wide-band average of mutual information using Shannon's formula. Using the above algorithm, the mean value of the prediction gain is approximately 5.6%. More elaborated algorithms may potentially increase the gain. The x-axis of FIG. 7 illustrates the average (WB) MI measured in bit/s/Hz, and the y-axis of FIG. 7 illustrates the CDF. The continuous line in FIG. 7 illustrates an optimal situation, the dotted line illustrates no delay and no prediction, the dotted and broken line illustrates delay, but no prediction and the broken line illustrates delay and prediction.

The gain is highly dependent on how stable the PMIs are in time, how fast the PMIs are reported, the reporting delay, etc.

In one embodiment, optimal shift may be achieved adaptively comparing different shift factors on historical data gathered near in time. The algorithm should retreat back to zero sub-band shift if no gain may be derived on historical data.

In some embodiments, the pre-coding weights are selected from a codebook as for ordinary closed loop spatial multiplexing in LTE.

In some embodiments, the estimated pre-coding weights are estimated with finer granularity than the pre-coding weights comprised in the obtained pre-coding reports. For example, in case of two antenna ports, 3GPP supports the following rank 1 precoders:

(1; 1), (1; −1), (1; j) and (1; −j)

Adding a factor 2 higher granularity may be obtained by adding the following rank 1 precoders (1; a), (1; a*), (1; b) and (1; b*), where a=(1+j)/sqrt(2) and b=(−1+j)/sqrt(2).

Note that a normalization factor is omitted. A normalization factor is selected to give the same transmitted energy in case of rank 1 and rank 2.

With the suggested frequency-time pre-coding shift the estimated best pre-coder may be in between the granularity of the code-book reported with PMI. With higher granularity of used precoders a more accurate beam forming may be done.

For LTE the PMI is reported per sub-band and pre-coding is performed per sub-band, that is the pre-coder is set equal for all 12 sub-carriers within the sub-band. With the suggested frequency-time pre-coding shift a pre-coder per sub-carrier may be estimated improve the frequency selectivity of the precoding.

Estimating the pre-coding weights with finer granularity improves the performance. Better performance may be obtained by using a larger codebook, but this comes with the cost of increased signaling. In certain cases there is no requirement that the reporting codebook and the transmitting codebook are equal. It may be possible to, for example, have a small reporting codebook, i.e. small signaling overhead, but a larger codebook from transmitting pre-coder is selected, providing possibility for increased performance.

Returning to FIG. 3.

Step 304

The first communication node 201 provides the estimated pre-coding weights to the second communication node 203.

Step 305

The first communication node 201 applies the estimated pre-coding weights to the data transmission to the second communication node 203. In other words, data is transmitted from the first communication node 201 to the second communication node 203 using the estimated pre-coding weights.

Figure 3:
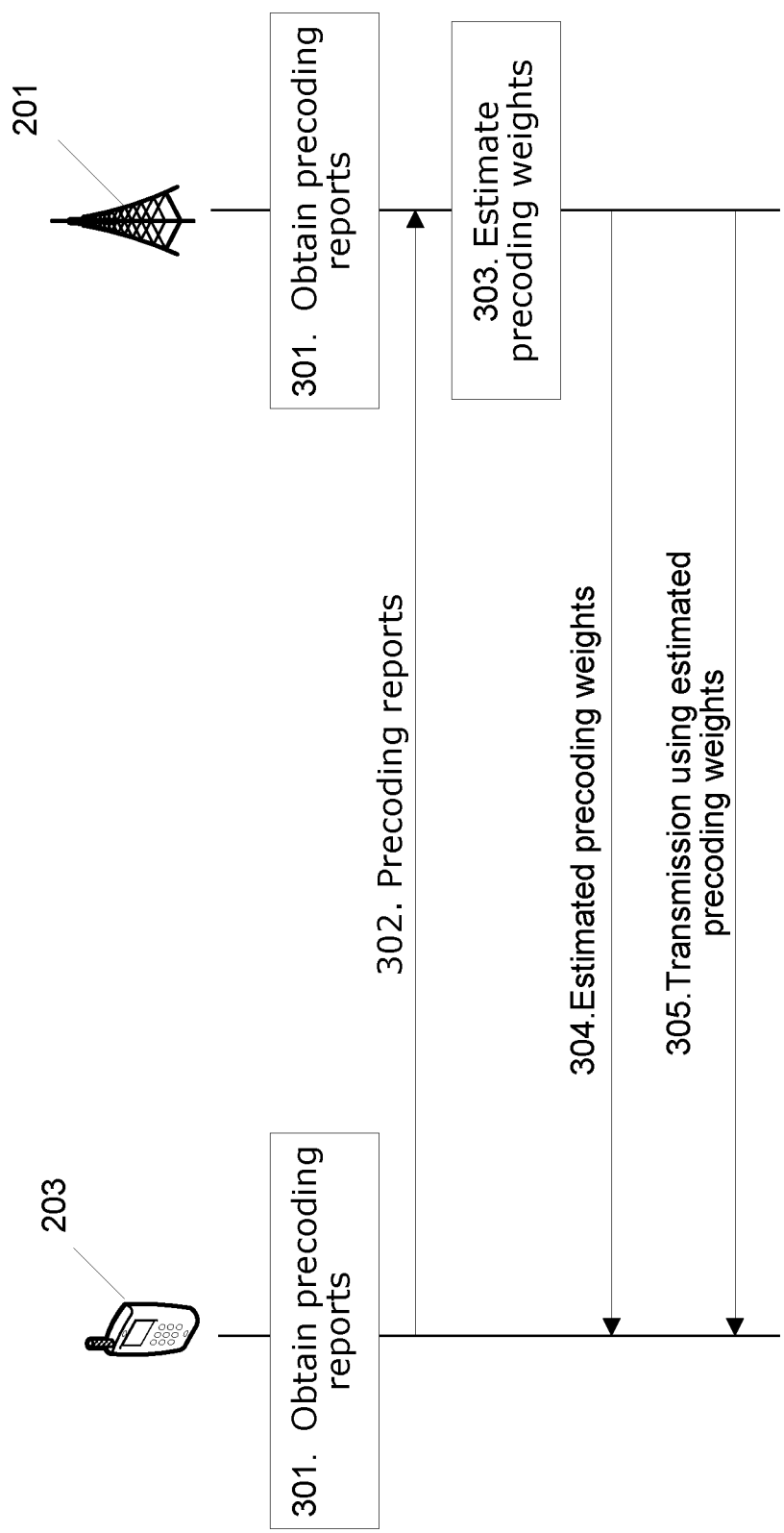
FIG. 3 is a combined signaling and flow diagram illustrating embodiments of a method.

The method shown in FIG. 3 may be used in MIMO beam forming, pre-coding and Coordinated Multipoint Transmission.

MIMO systems with several transmit antennas is supported for several mobile accesses, WCDMA, WiMax and LTE. For WiMax and LTE; frequency selective adaptive pre-coding is also supported enabling relative phase adjustments between transmit antennas to adapt to channel phases. The phase shifts may be adapted to add constructively and avoid nulling from several antennas with different channel paths to the receiver's antenna (s). For downlink, the receiver corresponds to the second communication node 203, for uplink, the receiver corresponds to the first communication node 201. Also multi-layer, i.e. multi-stream, transmissions may be improved by increased channel orthogonally. The delay and user equipment speed has an even larger impact on phase and pre-coding than on channel quality. The method described above predicts frequency selective phase deviation as a function of time.

Figure 8:
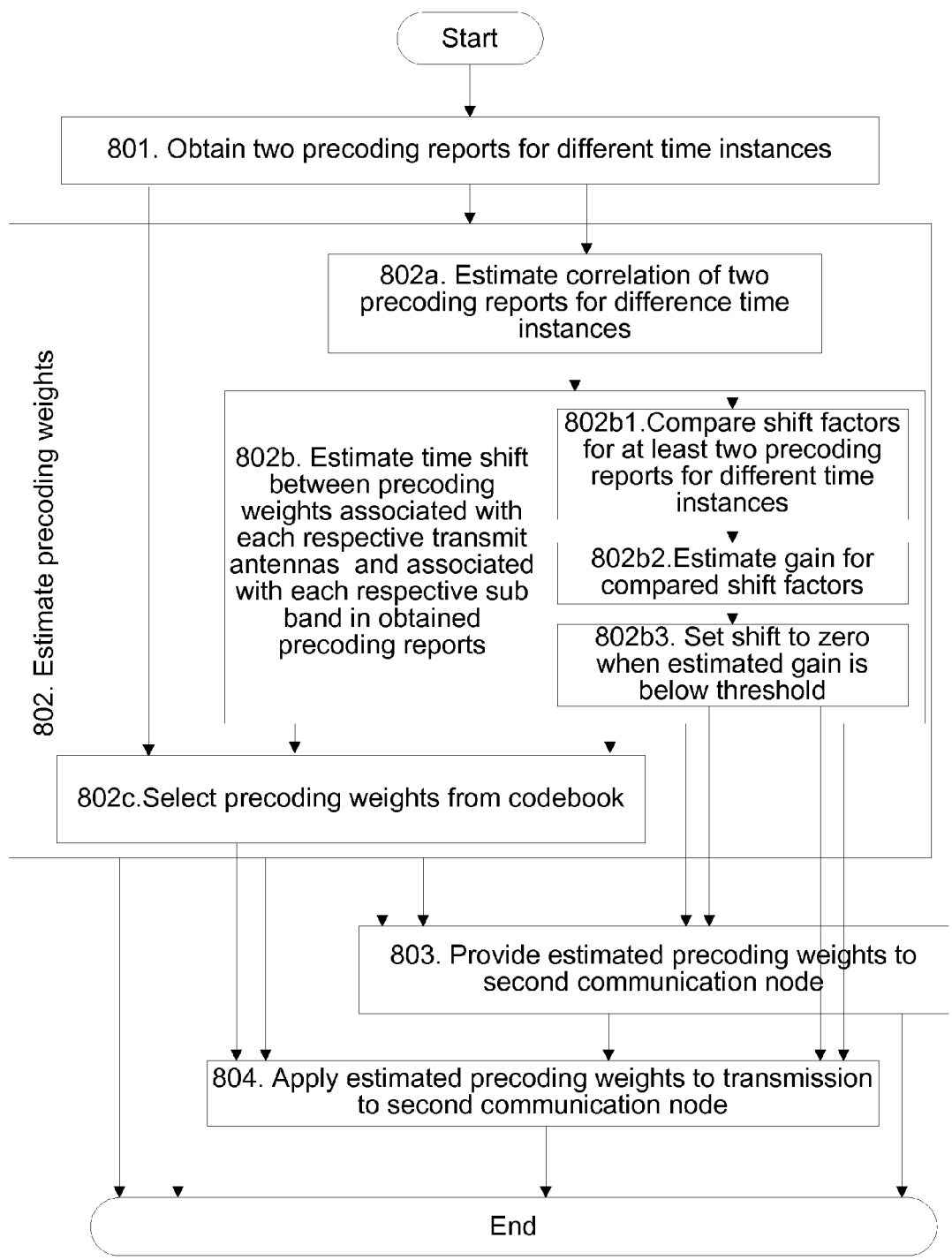
FIG. 8 is a flowchart depicting embodiments of a method in a first communication node.

The method described above will now be described seen from the perspective of the first communication node 201. FIG. 8 is a flowchart describing the present method in the first communication node 201 for estimating pre-coding weights for multi-antenna transmission on a radio channel 205 between the first communication node 201 and a second communication node 203 in a communication network 200. The first communication node 201 comprises at least two transmit antennas. Each respective transmit antenna is configured to transmit on each of at least two sub-bands. In some embodiments, the at least two transmit antennas are positioned in different sites in the communication network 200. The at least two sub-bands are comprised in the radio channel 205. The pre-coding weights may be a function of time and frequency. In some embodiments, the pre-coding weights comprise a pre-coding matrix indicator.

In some embodiments the first communication node 201 is a base station and the second communication node 203 is a user equipment, or the first communication node 201 is a user equipment and the second communication node 203 is a base station.

In some embodiments, the pre-coding weights comprise antenna channel phase or antenna channel amplitude.

The method comprises the steps to be performed in the first communication node 201:

Step 801

The first communication node 201 obtains at least two pre-coding reports. Each pre-coding report is for a different time instance. Each pre-coding report comprises pre-coding weights or indications to pre-coding weights. The pre-coding weights are associated with each of the respective transmit antennas and associated with each of the respective sub-band.

In some embodiments, the at least two pre-coding reports are obtained from the first communication node 201 or the second communication node 203.

Step 802

For each transmit antenna, the first communication node 201 estimates pre-coding weights for at least one of the at least two sub-bands based on the pre-coding weights in the at least two obtained pre-coding reports. The estimated pre-coding weights are different from a most recent of the obtained pre-coding reports.

In some embodiments, the pre-coding weights are estimated with finer granularity than the pre-coding weights comprised in the obtained pre-coding reports.

Step 802a

This is a subset of step 802. In some embodiments, the first communication node 201 estimates a correlation of the at least two pre-coding reports for difference time instances.

Step 802b

This is a subset of step 802 which is to be performed after step 802a. In some embodiments, based on the estimated correlation, the first communication node 201 estimates a time shift between the pre-coding weights associated with each of the respective transmit antennas and associated with each of the respective sub-band comprised in the obtained pre-coding reports.

Step 802b1

This is a subset of step 802b. In some embodiments, the first communication node 201 compares shift factors for the at least two pre-coding reports for different time instances.

Step 802b2

This is a subset of step 802b which is to be performed after step 802b1. In some embodiments, the first communication node 201 estimates a gain for the compared shift factors.

Step 802b3

This is a subset of step 802b which is to be performed after step 802b2. In some embodiments, the first communication node 201 sets the shift to zero when the estimated gain is below a threshold. In some embodiments, the threshold is zero.

Step 802c

This is a subset of step 802 which is to be performed instead of step 802a and 802b, or after 802b or after step 802b3. The first communication node 201 selects pre-coding weights from a codebook.

Step 803

In some embodiments, the first communication node 201 provides the estimated pre-coding weights to the second communication node 203.

Step 804

In some embodiments, the first communication node 201 applies the estimated pre-coding weights to the transmission to the second communication node 203.

Figure 9:
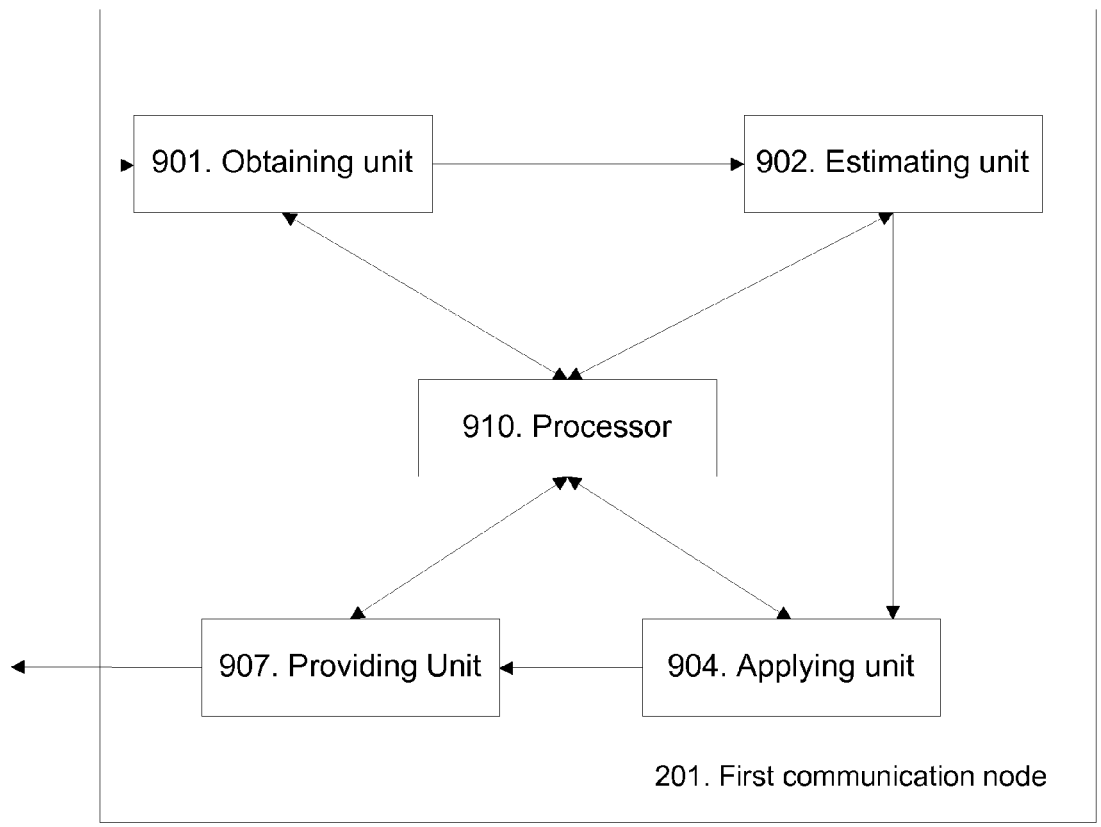
FIG. 9 is a schematic block diagram illustrating embodiments of a first communication node.

To perform the method steps shown in FIG. 8 for estimating pre-coding weights for transmission on a radio channel 205 between a first communication node 201 and a second communication node 203 in a communication network 200, the first communication node 201 comprises an arrangement as shown in FIG. 9. The first communication node 201 comprises at least two transmit antennas. Each respective transmit antenna is configured to transmit on each of at least two sub-bands. In some embodiments, the at least two transmit antennas are positioned in different sites in the communication network 200. The at least two sub-bands are comprised in the radio channel 205. In some embodiments, the first communication node 201 is a base station and the second communication node 203 is a user equipment, or the first communication node 201 is a user equipment and the second communication node 203 is a base station. In some embodiments, the pre-coding weights comprise an antenna channel phase or an antenna channel amplitude.

The first communication node 201 further comprises an obtaining unit 901 which is configured to obtain at least two pre-coding reports. Each pre-coding report is for a different time instance. Each pre-coding report comprises pre-coding weights or indications to pre-coding weights. The pre-coding weights are associated with each of the respective transmit antennas and associated with each of the respective sub-band. In some embodiments, the at least two pre-coding reports are obtained from the first communication node 201 or the second communication node 203. In some embodiments, the pre-coding weights are a function of time and frequency. In some embodiments, the pre-coding weights comprise a pre-coding matrix indicator.

The first communication node 201 comprises an estimating unit 902 configured to, for each transmit antenna, estimate pre-coding weights for at least one of the at least two sub-bands based on the pre-coding weights in the at least two obtained pre-coding reports. The estimated pre-coding weights are different from a most recent of the obtained pre-coding reports.

In some embodiments, the estimating unit 902 is further configured to estimate a correlation of the at least two pre-coding reports for difference time instances, and, based on the estimated correlation, estimate a time shift between the pre-coding weights associated with each of the respective transmit antennas and associated with each of the respective sub-band comprised in the obtained pre-coding reports.

In some embodiments, the estimating unit 902 is further configured to compare shift factors for the at least two pre-coding reports for different time instances, estimate a gain for the compared shift factors, and to set the shift to zero when the estimated gain is below a threshold. In some embodiments, the threshold may be zero.

In some embodiments, the estimating unit 902 is configured to select pre-coding weights from a codebook.

In some embodiments, the pre-coding weights are estimated with finer granularity than the pre-coding weights comprised in the obtained pre-coding reports.

In some embodiments, the first communication node 201 further comprises an applying unit 904 which is configured to apply the estimated pre-coding weights to the transmission to the second communication node 203.

In some embodiments, the first communication node 201 comprises a providing unit 907 configured to provide the estimated pre-coding weights to the second communication node 203.

The present mechanism for estimating pre-coding weights for a transmission on a radio channel 205 between the first communication node 201 and the second communication node 203 in a communication network 200 may be implemented through one or more processors, such as a processor 910 in the first communication node arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first communication node 201. One such carrier may be in the form of a CD ROM disc. It is however feasible with other data carriers such as a memory stick. The computer program code may furthermore be provided as pure program code on a server and downloaded to the first communication node 201 remotely.

The embodiments herein are not limited to the above described preferred embodiments. Various alternatives, modifications and equivalents may be used. Therefore, the above embodiments should not be taken as limiting the scope of the embodiments, which is defined by the appending claims.

It should be noted that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a first communication node for estimating pre-coding weights for a transmission on a radio channel between the first communication node and a second communication node in a communication network, wherein the first communication node comprises at least two transmit antennas, and wherein each respective transmit antenna is configured to transmit on each of at least two sub-bands, and wherein the at least two sub-bands are comprised in the radio channel, the method comprising:

obtaining at least two pre-coding reports, wherein each pre-coding report is for a different time instance, wherein each pre-coding report comprises pre-coding weights or indications to pre-coding weights, wherein the pre-coding weights are associated with each of the respective transmit antennas and associated with each of the respective sub-band; and for each transmit antenna, estimating pre-coding weights for at least one of the at least two sub-bands based on the pre-coding weights in the at least two obtained pre-coding reports, wherein the estimated pre-coding weights are different from a most recent of the obtained pre-coding reports, wherein the estimating pre-coding weights comprises:

estimating a correlation of the at least two pre-coding reports for different time instances; and based on the estimated correlation, estimating a time shift between the pre-coding weights associated with each of the respective transmit antennas and associated with each of the respective sub-band comprised in the obtained pre-coding reports.

2. The method according to claim 1, wherein the estimating a shift further comprises:

comparing shift factors for the at least two pre-coding reports for different time instances;

estimating a gain for the compared shift factors; and setting the shift to zero when the estimated gain is below a threshold.

3. The method according to claim 1, wherein the at least two pre-coding reports are obtained from the first communication node or the second communication node.

4. The method according to claim 1, wherein the pre-coding weights are a function of time and frequency.

5. The method according to claim 1, wherein the pre-coding weights comprise a pre-coding matrix indicator.

6. The method according to claim 1, wherein the first communication node is a base station and the second communication node is a user equipment, or wherein the first communication node is a user equipment and the second communication node is a base station.

7. The method according to claim 1, wherein the at least two transmit antennas are positioned in different sites in the communication network.

8. The method according to claim 1, wherein the pre-coding weights comprise an antenna channel phase or an antenna channel amplitude.

9. A first communication node for estimating pre-coding weights for a transmission on a radio channel between the first communication node and a second communication node in a communication network, wherein the first communication node comprises at least two transmit antennas, and wherein each respective transmit antenna is configured to transmit on each of at least two sub-bands, and wherein the at least two sub-bands are comprised in the radio channel, the first communication node further comprising:

an obtaining unit configured to obtain at least two pre-coding reports, wherein each pre-coding report is for a different time instance, wherein each pre-coding report comprises pre-coding weights or indications to pre-coding weights, wherein the pre-coding weights are associated with each of the respective transmit antennas and associated with each of the respective sub-band; and an estimating unit configured to, for each transmit antenna, estimate pre-coding weights for at least one of the at least two sub-bands based on the pre-coding weights in the at least two obtained pre-coding reports, wherein the estimated pre-coding weights are different from a most recent of the obtained pre-coding reports, wherein the estimating unit is configured to estimate the pre-coding weights by:

estimating a correlation of the at least two pre-coding reports for different time instances; and based on the estimated correlation, estimating a time shift between the pre-coding weights associated with each of the respective transmit antennas and associated with each of the respective sub-band comprised in the obtained pre-coding reports.

10. The first communication node according to claim 9, wherein the first communication node further comprises a transmitter for transmitting the estimated pre-coding weights to the second communication node, and the first communication node is configured to apply the estimated pre-coding weights to a transmission to the second communication node.

11. The first communication node according to claim 9, wherein the estimating a shift further comprises:

comparing shift factors for the at least two pre-coding reports for different time instances;

estimating a gain for the compared shift factors; and setting the shift to zero when the estimated gain is below a threshold.

* * * * *